United States Patent [19]
Yamakaji

[11] Patent Number: 6,082,211
[45] Date of Patent: Jul. 4, 2000

[54] WORKING MACHINE ATTACHING LINKAGE

[75] Inventor: Naoki Yamakaji, Amagasaki, Japan

[73] Assignee: Kanzaki Kokyukoki Mfg. Co., Ltd., Japan

[21] Appl. No.: 09/163,201

[22] Filed: Sep. 30, 1998

[30] Foreign Application Priority Data

Oct. 8, 1997 [JP] Japan ................................. 9-275773

[51] Int. Cl.[7] .......................... G05G 1/00; A01B 59/043; A01D 34/24
[52] U.S. Cl. .................. 74/469; 172/47; 56/15.2
[58] Field of Search .............................. 74/469; 403/161, 403/150, 154; 56/15.9, 15.2; 172/47, 439, 443, 450, 440, 441, 442

[56] References Cited

U.S. PATENT DOCUMENTS 3,207,529   9/1965   Harper ........................................ 172/47

FOREIGN PATENT DOCUMENTS 57-56641   12/1982   Japan .
59-92604   6/1984    Japan .
63-112403  7/1988    Japan .

Primary Examiner—David A. Bucci
Assistant Examiner—Colby Hansen
Attorney, Agent, or Firm—Sterne, Kessler, Goldstein & Fox PLLC

[57] ABSTRACT

A rear hitch is provided on the rear of a transmission casing. Rear axle casings, disposed at each side of the transmission casing, are provided with brackets. A hinge pin is spanned between rear hitch and each side bracket. A lower link and a check chain are pivotally supported on each hinge pin. A collar is provided on each hinge pin so as to be interposed between the lower link and the check chain.

2 Claims, 5 Drawing Sheets

WORKING MACHINE ATTACHING LINKAGE

BACKGROUND OF THE INVENTION

1. Field of the Invention

The present invention relates to supporting construction of lower links and check chains for anti-roll of the lower links of a working machine attaching linkage, especially, a three-point hitch linkage which is vertically movably provided on a front or rear portion of a working vehicle.

2. Related Art

As is well-known, an agricultural tractor of conventional utility is provided at the rear portion thereof with a working machine attaching linkage for attaching a working machine like a rotary cultivator, a tedder or a mower. A three-point hitch linkage comprising a top link, left and right lower links, left and right lift arms, left and right lift rods and left and right check chains is typical. The top link is pivotally supported by a link hitch fixedly provided on the rear surface of a transmission casing of the vehicle. The lower links are pivotally supported by respective brackets which are fixed to left and right rear axle casings provided on both sides of a rear portion of the transmission casing or are fixed to the transmission casing. The lower ends of the lift rods are pivoted on intermediate portions of the lower links, respectively and the upper ends thereof are pivoted on rear ends of the lift arms, respectively. The lift arms extend from a hydraulic lifting device on the transmission casing. The check chains are interposed between intermediate portions of the lower links and the rear axle casings or the brackets, respectively.

With regard to such a working machine attaching linkage, Japanese Utility Model Laid-Open Gazette No. Sho 63-112403 describes that a front end of each lower link is pivoted on a pivotal member provided on each side surface of a transmission casing. A front end of each check chain is pivoted on another pivotal member provided on each rear axle casing, coaxially with the pivotal member on the transmission casing.

Japanese Utility Model No. Sho 57-56641 and Japanese Utility Model Laid-Open Gazette No. Sho 59-92604 describe that a pivotal shaft is supported by a supporting member projecting rearwardly from each side of the transmission casing or from each rear axle casing so as to project both laterally and outwardly from the supporting member. The front end of each lower link and the front end of each check chain are pivoted on one and the other side portions of the pivotal shaft, respectively, about the supporting member.

Deviation of the front ends of the lower link and the check chain from each other with respect to their pivotal axes during vertical rotation of the linkage causes modification or abrasion of the pivotal members or others. In the two types of conventional constructions, the former type has the advantage of preventing the front ends of the lower link and the check chain from such deviation because the pivotal members provided on the transmission casing and the rear axle casing, respectively, are coaxial with each other. However, coaxially and respectively disposing the pivotal members on the transmission casing and the rear axle casing is difficult and expensive because it is necessary to ensure accuracy of the parts.

The second type also has the advantage of preventing the front ends of the lower link and the check chain from such deviation because both of the front ends thereof are pivoted on the same pivotal shaft. However, as the distance between the lower link and the check chain decreases, there is a reduction in the anti-rolling effect of the check chain. If the distance is increased, deformation of the pivotal shaft occurs because it is supported at its intermediate portion by only one supporting member. If the pivotal shaft is thickened for reinforcement, it is necessary to expand the supporting member proportionally.

SUMMARY OF THE INVENTION

The present invention is a working machine attaching linkage provided on the front or rear portion of a vehicle for attaching a working machine to the vehicle which is unique in that the lower links and check chains are supported by hinge pins. A hinge pin is supported on one end by a hitch provided on a transmission casing of the vehicle and on the other end by a respective supporting member provided on a respective axle casing. The axle casings are disposed on both sides of the transmission casing.

Due to this construction, each of the lower links and check chains is rotatable around the same axis of the hinge pins and is prevented from twist, abrasion, deformation or damage. Therefore, the lower links and check chains are able to rotate smoothly. The hinge pins are stable due to being supported on both lateral ends by the respective axle casings and the hitch, thereby being prevented from deformation.

On each of the hinge pins between the lower link and the check chain is removably interposed a collar. Due to this construction, a lift arm for vertically lifting a mid-mounted working machine can be provided on each hinge pin instead of the collar. As a result, the need for an additional bracket and its subsequent placement on the vehicle is eliminated and the change-over from a rear-mounted to a mid-mounted working machine can be done easily.

Other and further features and advantages of the present invention will appear more fully from the following description.

DETAILED DESCRIPTION OF THE PREFERRED EMBODIMENTS

Figure 1:
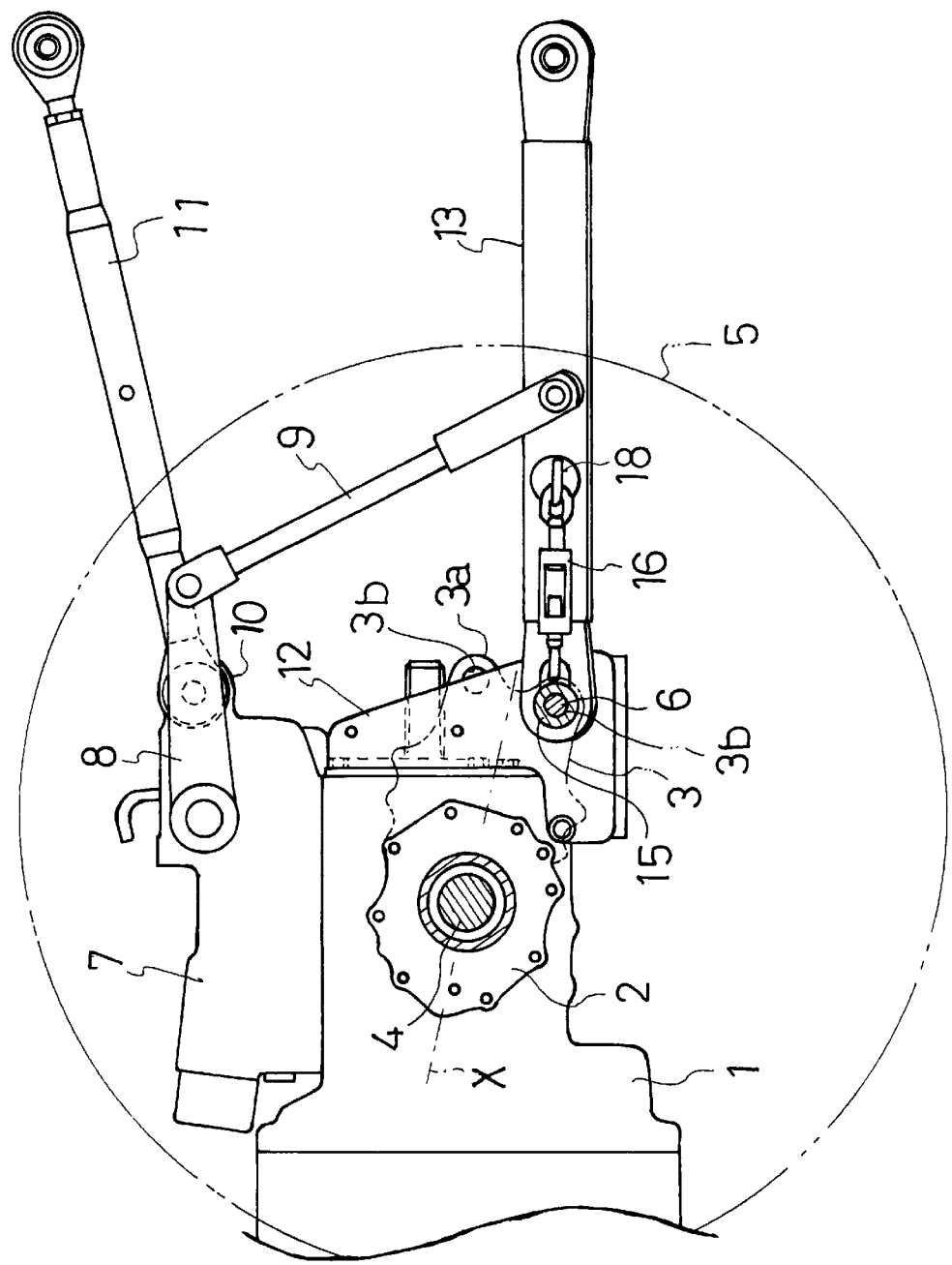
FIG. 1 is a side view of a working machine attaching linkage disposed at a rear portion of a tractor in accordance with the present invention.

At first, explanation will be given on the attachment of a three-point hitch linkage to a rear portion of a tractor, in accordance with FIGS. 1 and 2.

A transmission casing 1 is disposed at a rear portion of the tractor. A pair of rear axle casings 2 are fixed onto both lateral sides of casing 1. Each axle casing 2 is covered at the outer end thereof with an axle cover 3. In each casing 2 and axle cover 3 is journaled a differential output shaft 4, which is extended from a differential unit D disposed in the portion of transmission casing 1 between axle casings 2, and an axle 4b, which is engaged with differential output shaft 4 by speed reduction gears 4a. Axles 4b project outwardly from respective axle covers 3. A rear wheel 5 is fixed onto a wheel flange 4c, which is disposed on the outer end of each axle 4b.

Symmetric axle cover 3 can be used as both a left axle cover and a right axle cover. In this regard, axle cover 3, from which an integral bracket 3a extends rearward, is symmetric about a straight line X (shown in FIG. 1). Straight line X passes through the axis of axle 4b journaled within axle cover 3 and extends so as to vertically divide bracket 3a into halves of the inversely same shapes when axle cover 3 is settled onto axle casing 2. A pair of holes 3b are bored in bracket 3a so as to be symmetrically disposed about straight line X. Thus, when providing two axle covers 3 on both axle casings 2, one of the axle covers 3 is turned over upside down so that both axle covers 3 are bilaterally symmetrical with each other. With respect to left and right axle covers 3 fixed to both axle casings 2, holes 3b of one axle cover 3 can be disposed as high as those of the other.

Figure 2:
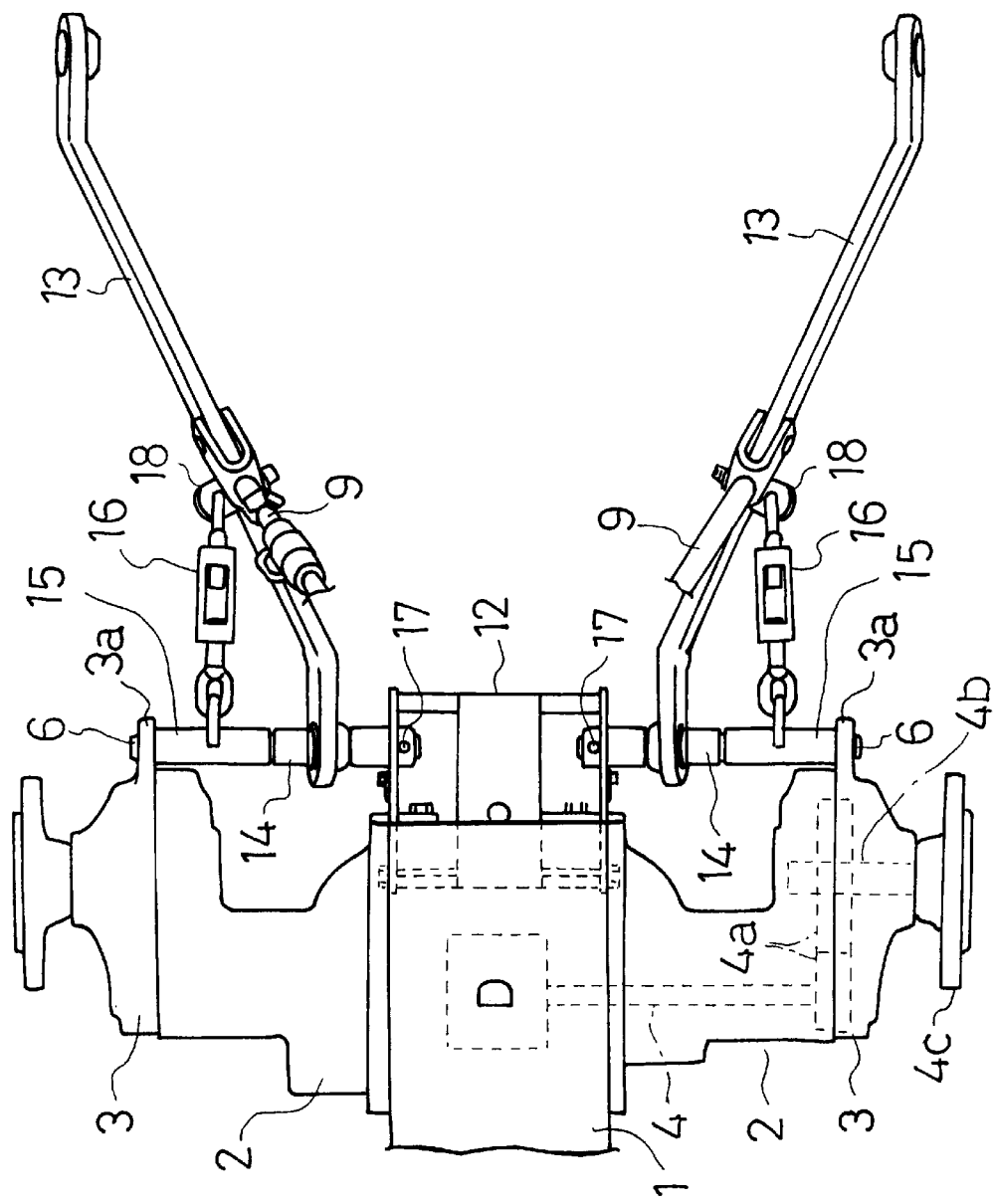
FIG. 2 is a plan view of the same.

As shown in FIG. 1, one end of a hinge pin 6 is inserted into the lower hole of upper and lower holes 3b of each axle cover 3. Alternatively, the end of hinge pin 6 may be inserted into the upper hole of upper and lower holes 3b of each axle cover 3. Also, when a working machine is disposed in front of transmission casing 1, both axle covers 3 should be fixed to axle casings 2 (occasionally, to the axle casings supporting the front axles) so that brackets 3a project forward from axle casings 2.

A hydraulic lifting apparatus casing 7 is mounted on transmission casing 1. A pair of lift arms 8 extend rearward from both side surfaces of hydraulic lifting apparatus casing 7 so as to pivotally support upper ends of lift rods 9 at the rear ends thereof. A hitch 10 is fixed to a rear surface of hydraulic lifting apparatus casing 7 (or transmission casing 1) so as to pivotally support the front end of a top link 11.

Figure 3:
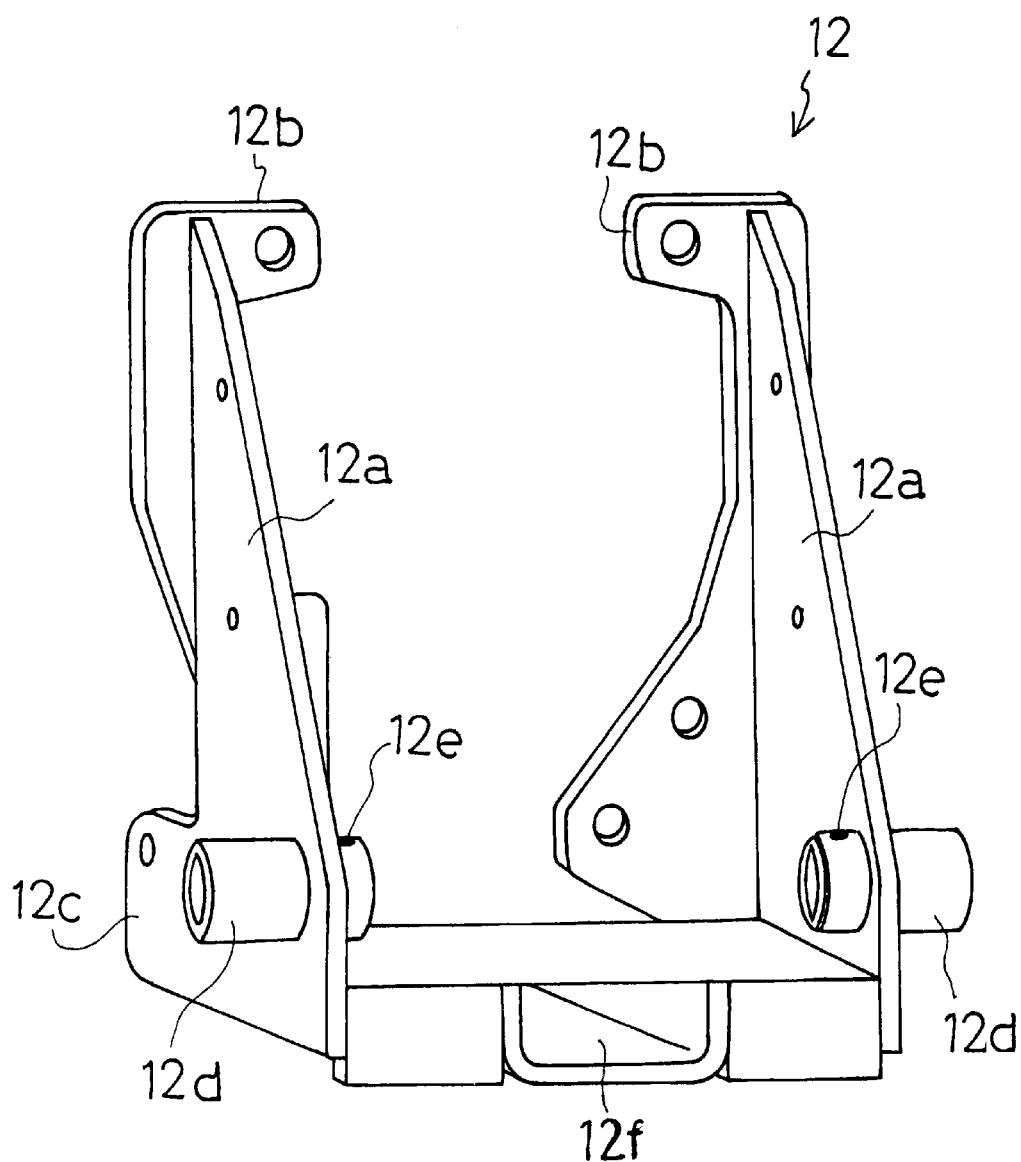
FIG. 3 is a perspective view of a rear hitch.

A rear hitch 12 (as shown in FIG. 3) is fixed onto the rear surface of transmission casing 1. Rear hitch 12 is L-like shaped when viewed from the side and L-like shaped when viewed from the rear. With regard to component parts of hitch 12, left and right main brackets 12a are disposed in parallel with each other. Front brackets 12b are fixed to front ends of respective main brackets 12a by welding and are bored for bolts so as to be fastened to the rear surface of transmission casing 1. Front side brackets 12c are bored for bolts and extend forward from respective foot portions of main brackets 12a so as to be fastened to both side surfaces of the rear portion of transmission casing 1. A drawbar housing component 12f, which can support a swing drawbar therein through the use of a drawbar pin, is provided between the lower end portions of main brackets 12a.

Main brackets 12a are integrally provided at the lower rear portion thereof with laterally outwardly and inwardly projecting bosses 12d. When rear hitch 12 is fixedly attached to transmission casing 1, the axes of bosses 12d substantially coincide with the respective axes of lower holes 3b of left and right axle covers 3.

Figure 4:
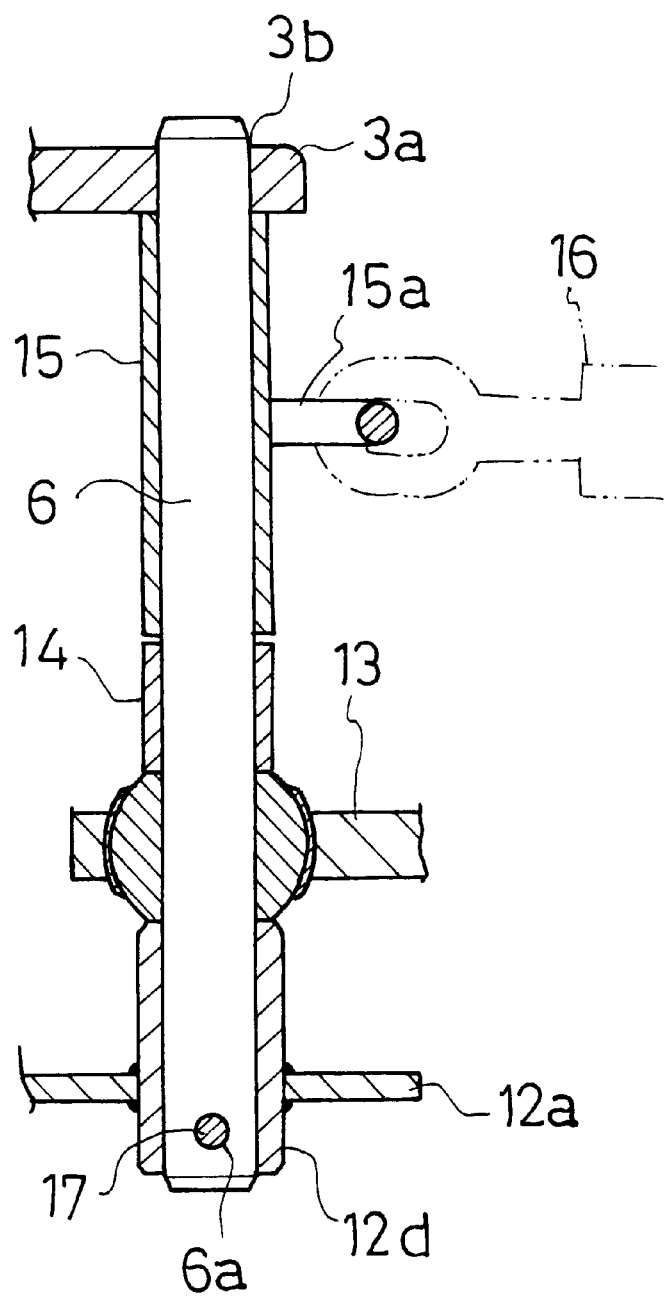
FIG. 4 is a sectional plan view of a lower link and a check chain pivotally supported by a hinge pin.

As shown in FIG. 4, hinge pin 6 is supported on one end by bracket 12a and on the other end by bracket 3a. In this regard, both ends of hinge pin 6 are inserted respectively into a hole in boss 12d and hole 3b in bracket 3a. The front end of lower link 13, a collar 14 and a check chain hitching pipe 15 are rotatably provided on each hinge pin 6. A check chain 16 is anchored in the front end to a hitch 15a projecting from check chain hitching pipe 15. Check chain 16 is anchored in the rear end to a hitch 18 disposed on the intermediate portion of lower link 13 near the lower end of lift rod 9 pivoted thereon. Thus, check chain 16 is interposed between check chain hitching pipe 15 and lower link 13. Check chain 16 forms a turnbuckle at the middle portion thereof so as to adjust its tension by rotation of the turnbuckle.

A pin hole 6a is diametrically bored through one end of hinge pin 6 and pin hole 12e is bored in the inwardly projecting portion of each boss 12d. When hinge pin 6 is inserted in boss 12d it is rotated so that there is agreement between pin hole 6a and pin hole 12e. When pin holes 6a and 12e coincide, a pin 17 is inserted through them so as to check the axial movement and rotation of hinge pin 6 in boss 12d, thereby preventing the friction between hinge pin 6 and boss 12d. Thus, hinge pin 6 can be fixed to rear hitch 12 by pin 17 only, thereby resulting in a reduced number of parts.

Accordingly, top link 11 is pivotally supported on the rear surface of hydraulic lifting apparatus casing 7 and each lower link 13 is pivotally supported between rear hitch 12 and axle cover 3, thereby constructing a three point hitch linkage wherein a working machine can be attached to the rear end hitches of links 11 and 12 thereof. Hydraulic operation of lift arms 8 in vertical rotation makes lower links 13 rotate vertically centering on hinge pins 6 through lift rods 9, thereby vertically moving the working machine connected to the hitch on the lower linkage.

Hinge pin 6 located between rear hitch 12 and axle cover 3 (or between brackets 12a and 3a) is supported at both ends thereof in accordance with the present invention, thereby having sufficient strength against deformation. Furthermore, the front end of lower link 13 and check chain hitching pipe 15 are disposed coaxially on hinge pin 6 and therefore do not axially deviate from each other during vertical moving operation of the lower linkage. Hence, the rear hitch 12, axle cover 3, hinge pin 6, check chain hitching pipe 15 with hinge 15a, lower link 13, hinge 18 and any other member abutting against another, is safe from being subjected to harmful stress, thereby resisting abrasion and deformation. Moreover, collar 14, which is interposed between the front end of lower link 13 and check chain hitching pipe 15, can ensure the distance between hitches 15a and 18 thereby resisting the stretching stress of check chain 16 and providing sufficient space for adjusting the length of the turnbuckle on check chain 16.

Figure 5:
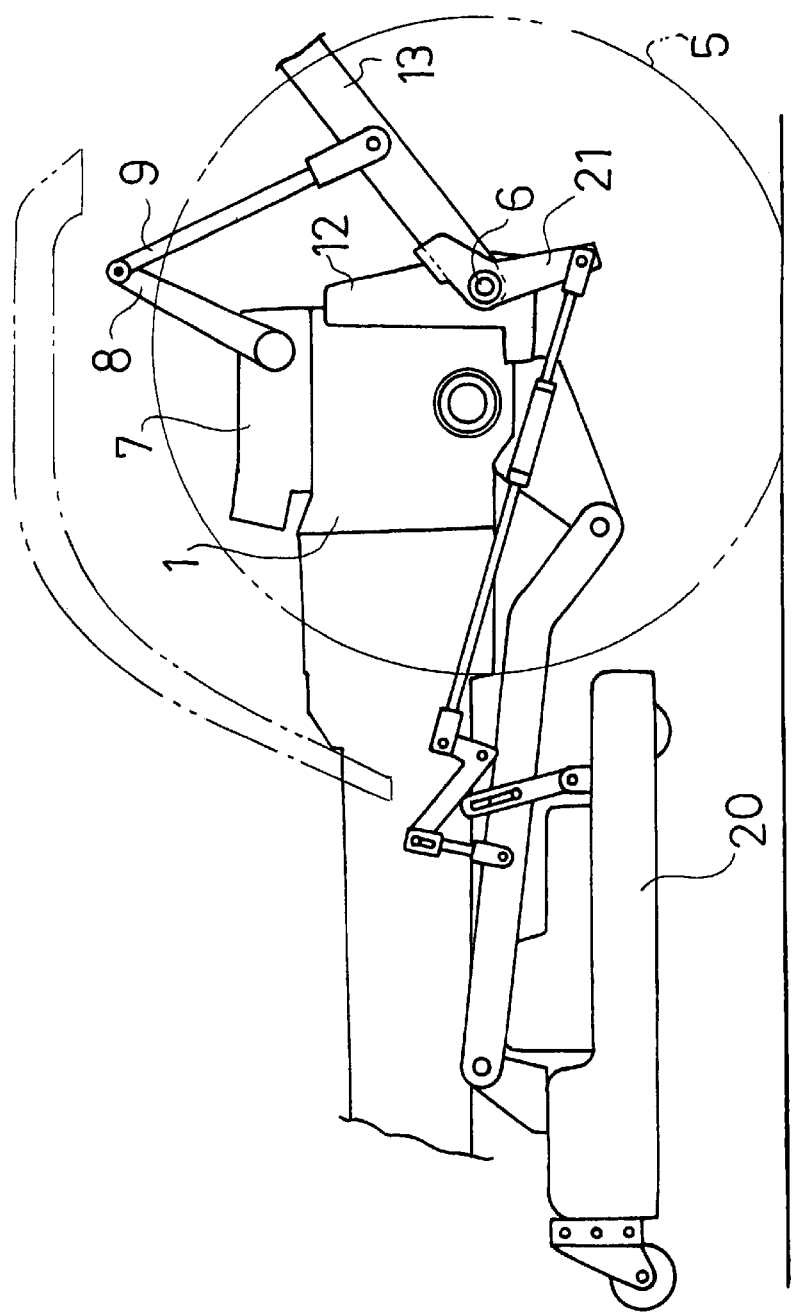
FIG. 5 is a side view of a rear portion of a tractor showing a lift arm of a mid-mounted working machine pivotally supported by the hinge pin instead of a collar.

Alternatively, a mid-mounted working machine can be connected to hinge pin 6 in place of collar 14. In this embodiment, as shown in FIG. 5, a lift arm 21 is connected to a mower 20 and is pivoted on hinge pin 6. Thus, no alternative bracket is required to attach lift arm 21 to the vehicle, thereby easily accommodating changes between rear-mounting and mid-mounting working machines. For vertical movement of mower 20, lift arm 21 is rotated by vertically rotating lower link 13. During this rotation, the front end of lower link 13, the front end of check chain 16 and the pivotal point of lift arm 21 do not axially deviate from one another, thereby enabling mower 20 to move smoothly.

What is claimed is:

1. A working machine attaching linkage of a vehicle comprising:

left and right lower links;

left and right check chains respectively connected to said left and right lower links for anti-roll;

a hitch provided on a transmission casing of the vehicle;

left and right axle casings provided on both sides of the transmission casing, wherein each of said axle casings is provided with a respective supporting portion, and hinge pins having respective first ends and respective second ends wherein each first end is supported by said hitch and each second end is supported by a respective supporting portion of said axle casings, wherein each of said lower links and each of said check chains are pivotally supported by one of said hinge pins.

2. A working machine attaching linkage of a vehicle as set forth in claim 1, further comprising:

collars, wherein each of said collars is removably interposed on each of said hinge pins between said lower link and said check chain.

* * * * *